(12) United States Patent
Eriksson et al.

(10) Patent No.: US 12,103,532 B2
(45) Date of Patent: Oct. 1, 2024

(54) METHOD FOR CONTROLLING A POWERTRAIN

(71) Applicant: VOLVO TRUCK CORPORATION, Gothenburg (SE)

(72) Inventors: Anders Eriksson, Torslanda (SE); Claes Kuylenstierna, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 211 days.

(21) Appl. No.: 17/909,520

(22) PCT Filed: Mar. 13, 2020

(86) PCT No.: PCT/EP2020/056756
§ 371 (c)(1),
(2) Date: Sep. 6, 2022

(87) PCT Pub. No.: WO2021/180332
PCT Pub. Date: Sep. 16, 2021

(65) Prior Publication Data
US 2023/0347895 A1    Nov. 2, 2023

(51) Int. Cl.
| | | |
|---|---|---|
| B60W 30/18 | (2012.01) |
| B60W 10/06 | (2006.01) |
| B60W 10/10 | (2012.01) |
| F02B 75/02 | (2006.01) |
| F02D 13/02 | (2006.01) |
| F02D 13/04 | (2006.01) |
| F02D 41/02 | (2006.01) |
| F02D 41/12 | (2006.01) |

(52) U.S. Cl.
CPC ...... B60W 30/18109 (2013.01); B60W 10/06 (2013.01); B60W 10/10 (2013.01);
(Continued)

(58) Field of Classification Search
CPC ........... B60W 30/18109; B60W 10/06; B60W 10/10; B60W 2510/0638;
(Continued)

(56) References Cited

U.S. PATENT DOCUMENTS 8,606,483 B2 * 12/2013 Krupadanam ...... F02D 41/0087
701/101
2009/0325761 A1    12/2009 Surnilla et al.

FOREIGN PATENT DOCUMENTS

EP    0849110 A2    6/1998
WO    2019161935 A1    8/2019

OTHER PUBLICATIONS

International Search Report and Written Opinion of the International Searching Authority, PCT/EP2020/056756, mailed Nov. 27, 2020, 11 pages.

* cited by examiner

Primary Examiner — Mahmoud Gimie
(74) Attorney, Agent, or Firm — Sage Patent Group

(57) ABSTRACT

A method for controlling a powertrain of a vehicle, the powertrain comprising:
an engine comprising mutually independently operable valves, the engine being configured to be operated in a four-stroke operation mode, and
a drivetrain comprising a transmission,
the method comprising:
while operating the engine in the four-stroke operation mode, identifying that a critical situation applies or is expected to apply, in which a fast downshift of the transmission is required,
initiating a downshift process in response to the identification of the critical situation,
during at least a part of the downshift process, increasing an engine speed by controlling at least the mutually independently operable valves of the engine such that the engine is temporarily operated in a two-stroke operation mode.

15 Claims, 2 Drawing Sheets

(52) U.S. Cl.
CPC .......... *F02B 75/02* (2013.01); *F02D 13/0203* (2013.01); *F02D 13/028* (2013.01); *F02D 13/04* (2013.01); *F02D 41/0215* (2013.01); *F02D 41/12* (2013.01); *B60W 2510/0638* (2013.01); *B60W 2510/1005* (2013.01); *B60W 2520/00* (2013.01); *B60W 2530/10* (2013.01); *B60W 2552/15* (2020.02); *F02B 2075/025* (2013.01); *F02B 2075/027* (2013.01); *F02D 2200/101* (2013.01); *F02D 2200/50* (2013.01); *F02D 2200/702* (2013.01)

(58) Field of Classification Search
CPC ..... B60W 2510/1005; B60W 2520/00; B60W 2530/10; B60W 2552/15; B60W 2552/20; B60W 2710/0644; B60W 2710/1005; B60W 10/11; B60W 30/19; B60W 50/0097; F02B 75/02; F02B 2075/025; F02B 2075/027; F02B 69/06; F02D 13/0203; F02D 13/028; F02D 13/04; F02D 41/0215; F02D 41/12; F02D 2200/101; F02D 2200/50; F02D 2200/702; F16H 63/50; F16H 2061/0492; F16H 2061/0496; F16H 61/0403
USPC ........................................................ 701/102
See application file for complete search history.

METHOD FOR CONTROLLING A POWERTRAIN

CROSS REFERENCE TO RELATED APPLICATIONS

This application is a 35 U.S.C. § 371 national stage application of PCT International Application No. PCT/EP2020/056756 filed on Mar. 13, 2020, the disclosure and content of which is incorporated by reference herein in its entirety.

TECHNICAL FIELD

The invention relates to a method for controlling a powertrain of a vehicle and to a control device for controlling a powertrain of a vehicle. The invention also relates to a vehicle, a computer program, and a computer readable medium.

The invention can be applied in heavy-duty vehicles, such as trucks, buses and construction equipment. Although the invention will be described with respect to a truck, the invention is not restricted to this particular vehicle, but may also be used in other vehicles such as light-weight trucks, buses, articulated haulers, wheel loaders, and passenger cars.

BACKGROUND

To be able to downshift a transmission of a vehicle by engaging a lower gear of the transmission, the lower gear having a higher gear ratio than a presently engaged gear, the engine speed needs to be increased such as to synchronize the engine speed and a rotational speed of the lower gear. During the downshifting process, a drivetrain of the vehicle needs to be disconnected from the engine, leading to an interruption in the transmission of torque from the engine to drive wheels of the vehicle. In certain situations, it is crucial that the synchronization is rapid such that a fast downshift may be achieved and the torque interruption is minimized. Such situations include steep uphill situations, in which an extended torque interruption may lead to an undesired loss in vehicle speed, and downhill situations, in which it is desired to use engine braking and in which an extended torque interruption may lead to a rapidly increasing vehicle speed. In a worst case scenario, the vehicle speed may increase faster than the engine speed so that engagement of a lower gear is not possible and the driver loses control of the vehicle.

SUMMARY

A primary object of the invention is to provide an in at least some aspect improved method and control device for controlling a powertrain in critical situations, such as downhill and/or uphill situations in which fast downshifting is needed.

According to a first aspect of the invention, at least the primary object is achieved by a method for controlling a powertrain of a vehicle according to claim 1. The powertrain comprises:
an engine comprising mutually independently operable valves, the engine being configured to be operated in a four-stroke operation mode, and
a drivetrain comprising a transmission.

The proposed method comprises:
while operating the engine in the four-stroke operation mode, identifying that a critical situation applies or is expected to apply, in which a fast downshift of the transmission is required,
initiating a downshift process in response to the identification of the critical situation,
during at least a part of the downshift process, increasing an engine speed by controlling at least the mutually independently operable valves of the engine such that the engine is temporarily operated in a two-stoke operation mode.

The engine comprising mutually independently operable valves may be referred to as a free-valve engine, or as a camless engine. The engine lacks traditional camshaft(s) and is instead provided with mutually independently operable valves. The valves may be controlled so as to operate the engine in a four-stroke operation mode, which is the default operation mode of the engine, and in a two-stroke mode, which may be used during the downshift process according to the proposed method. Of course, changing the operation mode from the four-stroke operation mode to the two-stroke operation mode also involves changing other parameters, such as various fuel injection parameters. It is to be understood that the engine is an internal combustion engine and that the valves are inlet and exhaust valves of cylinder(s) of the engine.

The critical situation may be a critical downhill situation, in which the vehicle speed is expected to increase during the downshift process, for example a situation in which the vehicle speed is expected to increase above a predefinable threshold speed, or above a predefinable threshold rate. The critical situation may alternatively be a critical uphill situation, in which the vehicle speed is expected to decrease during the downshift process, for example a situation in which the vehicle speed is expected to decrease below a predefinable threshold speed, or above a predefinable threshold rate. The expected change in vehicle speed may e.g. be determined based on road slope, optionally in combination with vehicle weight and/or other vehicle parameters that may affect the vehicle speed during the downshift process.

By temporarily operating the engine in a two-stroke operation mode, it is possible to more rapidly increase the engine speed during the downshift process than in the four-stroke operation mode. A faster downshift may thereby be achieved, which is beneficial in both uphill and downhill situations. In particular, it increases the vehicle safety in downhill critical situations in which the vehicle speed is rapidly increasing and in which it may be challenging to accelerate the engine sufficiently fast during synchronization of the engine speed with the rotational speed of a targeted lower gear.

The transmission may be a semi-automatic transmission, also known as an automated manual transmission (AMT).

The downshift process may further comprise braking the engine so as to reduce the engine speed when a target engine speed for downshifting has been reached, either in the two-stroke or in the four-stroke operation mode. The engine speed may be increased slightly above the target engine speed, and thereafter braked to reach the target engine speed. The acceleration-braking process may be iterated to reach the target engine speed and engage a selected gear, although it is possible to engage the selected gear even when the engine speed fluctuates around the target engine speed and has not stabilized at the target engine speed for downshifting. A faster downshifting may thereby be achieved at the cost of a reduced comfort.

Optionally, the step of identifying that the critical situation applies or is expected to apply comprises assessing information relating to a road slope of a road on which the vehicle travels or is expected to travel. That a critical situation applies or is expected to apply is thus identified based on at least the road slope. For example, a critical situation may be identified as a situation in which the road slope is above a predefinable threshold value.

Such a threshold value may be set in dependence on e.g. vehicle speed and/or vehicle weight.

Optionally, the step of identifying that the critical situation applies or is expected to apply further comprises assessing information relating to a weight of the vehicle. That a critical situation applies or is expected to apply is thus identified based on at least the road slope and the weight of the vehicle. The vehicle weight is primarily relevant in uphill critical situations, but the vehicle mass, or vehicle weight, is also relevant in downhill critical situations.

Optionally, the downshift process comprises engaging a selected gear once a target engine speed for downshifting has been reached. The selected gear is a gear having a higher gear ratio than a gear engaged prior to the downshift process, such that a transmission output torque is reduced with respect to the transmission output torque prior to downshifting. The target engine speed for downshifting is an engine speed which is synchronized with, preferably equal to, a rotational speed of the selected gear.

Optionally, the downshift process comprises increasing the engine speed in the two-stroke operation mode to at least the target engine speed. Fast acceleration of the engine until the target engine speed is reached is thereby ensured. Depending on the situation, it is possible to continue operation of the engine in the two-stroke operation mode also after reaching the target engine speed. Alternatively, four-stroke operation may be resumed immediately after reaching the target engine speed.

Optionally, the downshift process further comprises braking the engine in the two-stroke operation mode once the target engine speed has been reached. Efficient braking of the engine is thereby achieved, facilitating rapid synchronization of the engine speed and the rotational speed of the selected gear. Accelerating the engine in the two-stroke operation mode may comprise increasing the engine speed above the target speed, and thereafter braking the engine in the two-stroke operation mode such that the target speed is reached.

Optionally, the method further comprises:
subsequently to the downshift process, controlling the mutually independently operable valves of the engine such that the four-stroke operation mode of the engine is resumed.

The four-stroke operation mode is associated with a lower fuel consumption and lower emission levels than the two-stroke operation mode and it is for these reasons beneficial to resume the four-stroke operation mode as fast as possible.

Optionally, the method further comprises:
subsequently to the downshift process and prior to resuming the four-stroke operation mode, continuing to operate the engine in the two-stroke operation mode until a predefinable condition is fulfilled.

For example, the predefinable condition may be set to be fulfilled when a predetermined time period has elapsed, or once a predetermined turbo pressure is reached. The two-stroke mode enables a higher power output and build-up of a turbo pressure. In particular in steep uphill critical situations, it may therefore be beneficial to shortly gain speed using the two-stroke operation mode after the downshift. In this case, additional air may need to be supplied to the engine since the combustion frequency is increased in the two-stroke operation mode in comparison with the four-stroke operation mode. An additional air tank may be provided for this purpose.

Optionally, the critical situation is expected to arise during downhill travel, wherein a vehicle speed of the vehicle is expected to increase in the critical situation. The critical situation may for example be identified as a situation in which the vehicle speed is expected to accelerate above a predefinable threshold level, based on for example road slope.

Optionally, the downshift process comprises disengaging the drivetrain from the engine prior to the step of controlling the valves of the engine such that the engine is temporarily operated in the two-stoke operation mode. This is beneficial in particular in downhill critical situations, in which it is not desirable to build a turbo pressure prior to disengaging the drivetrain. For example, a clutch may be used.

Optionally, when the identified critical situation is an uphill critical situation, the step of controlling the valves of the engine such that the engine is operated in the two-stoke operation mode is initiated prior to disengaging the drivetrain from the engine. This allows building a turbo pressure prior to disconnecting the drivetrain, which may be beneficial in uphill downshifting situations in which the vehicle speed may rapidly decrease as the drivetrain is disengaged. The turbo pressure allows gaining speed faster after the downshift.

According to a second aspect of the invention, at least the primary object is achieved by a control device for controlling a powertrain of a vehicle, the powertrain comprising:
an engine comprising mutually independently operable valves, the engine being configured to be operated in a four-stroke operation mode, and
a drivetrain comprising a transmission,
the control device comprising means adapted to execute the steps of the method according to the first aspect of the invention.

The control device may be an electronic control device. The control device may comprise at least one communication interface for receiving data communicated from other units within the vehicle, such as from various sensors, systems and control units, in particular from one or more electronic control units (ECUs) controlling systems or subsystems in the vehicle, such as an engine control unit and a transmission control unit. The control device may be configured to communicate wirelessly or via a hardwire system. Information relating to road slope may be provided to the control device via the communication interface and may for example be based on map data in combination with positioning information, such as global positioning system (GPS) information, and/or based on sensor data from at least one local environment perception sensor such as a camera, a radar or a lidar mounted on the vehicle. Information relating to road slope may also be downloaded from and/or uploaded to a shared data storage with which the control device is configured to exchange information.

Advantages and advantageous features of the control device according to the second aspect are largely analogous to advantages and advantageous features of the method according to the first aspect.

According to a third aspect of the invention, a computer program comprising program code means for causing the control device according to the second aspect to execute the steps of the method according to the first aspect is provided.

According to a fourth aspect of the invention, a computer readable medium having stored thereon a computer program according to the third aspect is provided.

According to a fifth aspect of the invention, a vehicle comprising a powertrain is provided, the powertrain comprising:

an engine comprising mutually independently operable valves, the engine being configured to be operated in a four-stroke operation mode, and a drivetrain comprising a transmission, wherein the vehicle further comprises a control device according to the second aspect of the invention. Advantages and advantageous features of the vehicle according to the fifth aspect are largely analogous to advantages and advantageous features of the control device according to the second aspect.

The vehicle may be a heavy vehicle, such as a bus or a truck or a working machine.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
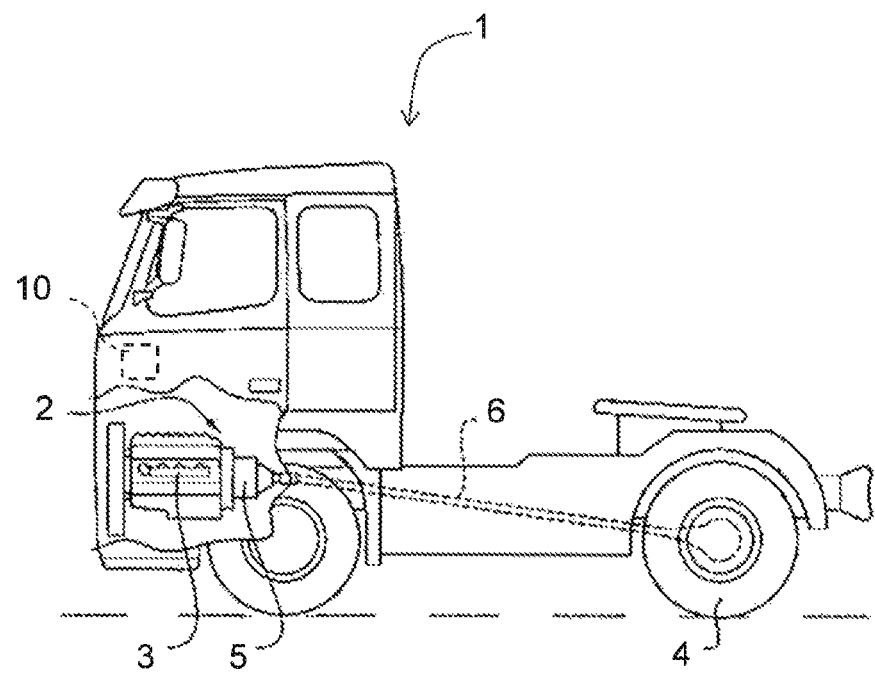
FIG. 1 shows a vehicle according to an embodiment of the invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

A vehicle 1 in the form of a heavy-duty truck is schematically shown in FIG. 1. The vehicle 1 includes a control device 10 for controlling a powertrain 2 of the vehicle 1. The powertrain 2 includes an internal combustion engine 3, although other propulsion units may additionally be provided, such as one or more electric machines. The powertrain 2 further comprises a drivetrain of the vehicle 1, including ground-engaging members in the form of drive wheels 4, a semi-automatic transmission 5, and a driveshaft 6. The engine 3, which may be a multi-cylinder engine, is a camless engine comprising mutually independently operable intake and exhaust valves (not shown), operable by means of electromagnetic, hydraulic, or pneumatic actuators (not shown). The actuators may e.g. be controlled by the control device 10 or by a separate engine control unit (now shown), which is arranged to communicate with the control device 10 over a network or another communications connection, such as a hardwired connection, a wireless connection, or a combination of hardwired and wireless connections. Opening and closing of each valve may thus be independently controlled in response to signals from the control device 10 and/or from the separate engine control unit. Analogously, a separate transmission control unit (now shown) may be provided for controlling the transmission 5, the transmission control unit being configured to communicate with the control device 10.

The engine 3, is configured to be operated in a four-stroke operation mode, i.e. a mode in which a power cycle is completed in two crankshaft revolutions. The four strokes include an intake stroke, a compression stroke, a combustion stroke and an exhaust stroke. However, by controlling the mutually independently controllable valves, and other variables such as fuel injection variables, the engine 3 may also be operated in a two-stroke operation mode, in which the power cycle is completed in a single crankshaft revolution. In this case, intake and exhaust occur during the same stroke.

Figure 2:
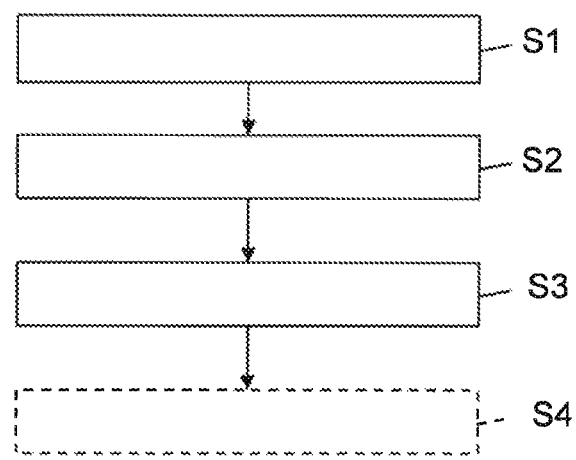
FIG. 2 is a flow chart illustrating a method according to an embodiment of the invention, FIG. 3 schematically shows a road on which a vehicle according to an embodiment of the invention is travelling.
Figure 3:
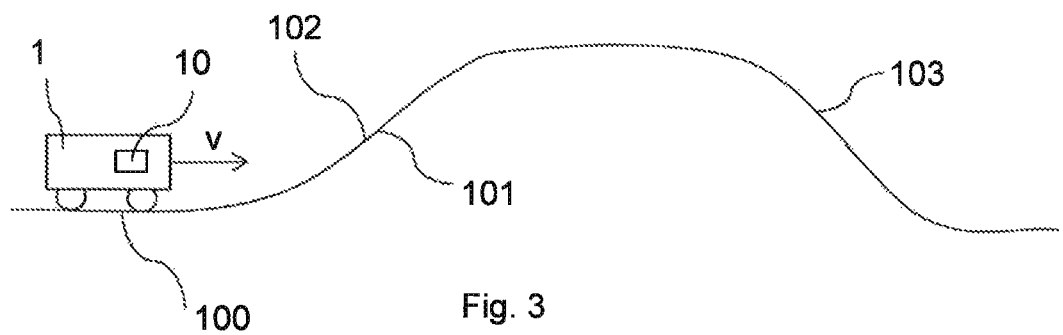

A method for controlling the powertrain 2 of the vehicle 1 according to an embodiment of the invention is schematically illustrated in FIG. 2. Reference is also made to FIG. 3, showing the vehicle 1 travelling along a road 101 at a vehicle speed v. The method may be carried out using the control device 10.

In a first step S1, carried out while operating the engine 3 in the four-stroke operation mode, it is identified that a critical situation applies or is expected to apply, in which a fast downshift of the transmission 5 is required. The critical situation may apply, or be expected to apply, as the vehicle travels uphill (uphill critical situation) or downhill (downhill critical situation). Identifying that the critical situation applies or is expected to apply may comprise assessing information relating to a road slope of the road 101 on which the vehicle travels or is expected to travel. The step of identifying that the critical situation applies or is expected to apply may also comprise assessing information relating to a weight of the vehicle 1. Also the vehicle speed v may be taken into account, as well as an engine speed n of the engine 3. Generally, the critical situation is identified when, during a downshift, the vehicle speed is expected to change at such a rate that it becomes difficult to increase the engine speed n to the rotational speed of a selected target gear sufficiently fast. The expected vehicle speed increase may be determined based on e.g. the information relating to road slope and vehicle weight.

In a second step S2, a downshift process is initiated in response to the identification of the critical situation. The downshift process generally comprises disengaging the drivetrain from the engine 3, disengaging a current gear, synchronizing the engine speed n with a rotational speed of a selected gear having a higher gear ratio than the current gear, engaging the selected gear, and reconnecting the engine 3 to the drivetrain.

Figure 4:
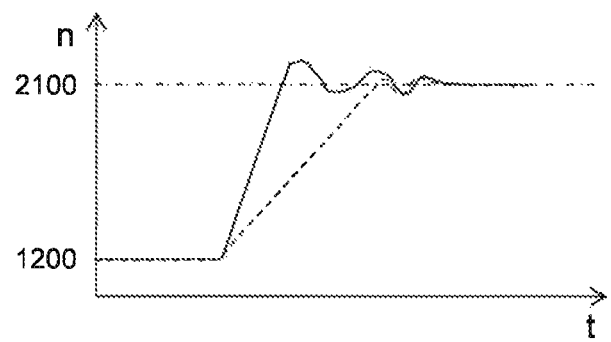
FIG. 4 is a diagram showing engine speed for a vehicle as a function of time during a critical situation.

In a third step S3, the engine speed n is increased during at least a part of the downshift process, by controlling at least the mutually independently operable valves of the engine 3 such that the engine 3 is temporarily operated in the two-stoke operation mode. This enables accelerating the engine 3 faster than in the four-stroke operation mode. The engine speed n may be increased in the two-stroke operation mode to a target engine speed for downshifting. It may also be increased to an engine speed above the target engine speed, in which case the engine is subsequently braked to reach the target engine speed. This is illustrated in the diagram of FIG. 4, in which the solid line schematically shows the engine speed n as a function of time t in the two-stroke operation mode, and the dashed line shows the corresponding engine speed n in the four-stroke operation mode. The target engine speed for downshifting is in this case 2100 rpm. As illustrated the engine speed n is rapidly increased above the target engine speed of 2100 rpm in the two-stroke operation mode and is thereafter braked to the target engine speed of 2100 rpm. The braking of the engine 3 may also be effectuated in the two-stroke operation mode. As can be seen, the engine speed n may fluctuate around the target engine speed before stabilizing. However, it is possible to engage the selected gear prior to stabilization at the target engine speed, at the cost of lower comfort.

The method may further comprise an optional fourth step S4 of, subsequently to the downshift process, controlling the mutually independently operable valves of the engine 3 such that the four-stroke operation mode of the engine 3 is resumed. This step may be carried out after reconnecting the drivetrain to the engine 3. It is possible to continue to operate the engine in the two-stroke operation mode after the downshift process has been completed, for example until a predefinable condition is fulfilled.

Two different driving scenarios will now be described with reference to FIG. 4. In both scenarios, the vehicle 1 is operated in the four-stroke operation mode at the beginning of the respective scenario.

In a first driving scenario, it is detected that the vehicle 1 approaches a steep uphill road section 102. It is identified, based on the road slope and on the vehicle weight, that a critical situation is expected to apply during a downshift process of the vehicle 1 in the steep uphill road section 102. The vehicle speed v is expected to decrease significantly during the downshift process as a result of the interruption in the transmission of torque from the engine 3 to the drive wheels 4 of the vehicle 1. A fast downshift is therefore required. To prepare for the downshift, the valves are controlled such that the engine 3 is operated in the two-stroke operation mode, thereby building a turbo pressure prior to disconnecting the drivetrain. Once a turbo pressure has been built up, the drivetrain is disengaged from the engine 3. As a result, the engine speed n rapidly increases. Once the target engine speed for downshifting has been exceeded, the engine 3 is braked, still in the two-stroke operation mode, to synchronize the engine speed with the rotational speed of a selected target gear. When the selected target gear has been engaged, the engine 3 and the drivetrain are reconnected, but the engine 3 is operated in the two-stroke operation mode until a predefined condition is met, with the purpose of building a turbo pressure. When the predefined condition is fulfilled, the valves are controlled such as to resume the four-stroke operation mode.

In a second driving scenario, the vehicle 1 is approaching a downhill road section 103 in which a critical downhill situation is expected to apply. In the steep downhill road section 103, there is a risk that the vehicle speed v increases rapidly when the drivetrain is disengaged, so that synchronization of the engine speed n with the rotational speed of the selected target gear will be difficult in the four-stroke operation mode. However, a downshift is desirable in order to be able to brake the vehicle more efficiently using the engine brake. Therefore, once the drivetrain has been disengaged, the valves are controlled so as to operate the engine 3 in the two-stroke operation mode. The engine speed n is rapidly increased above the target engine speed for downshifting, and is subsequently braked, still in the two-stroke operational mode. As soon as the selected target gear has been engaged, the four-stroke operation mode is resumed by controlling the valves of the engine 3. This may be performed simultaneously with, or before, or right after, reconnecting the drivetrain and the engine 3.

The control functionality of the example embodiments may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Figure 5:
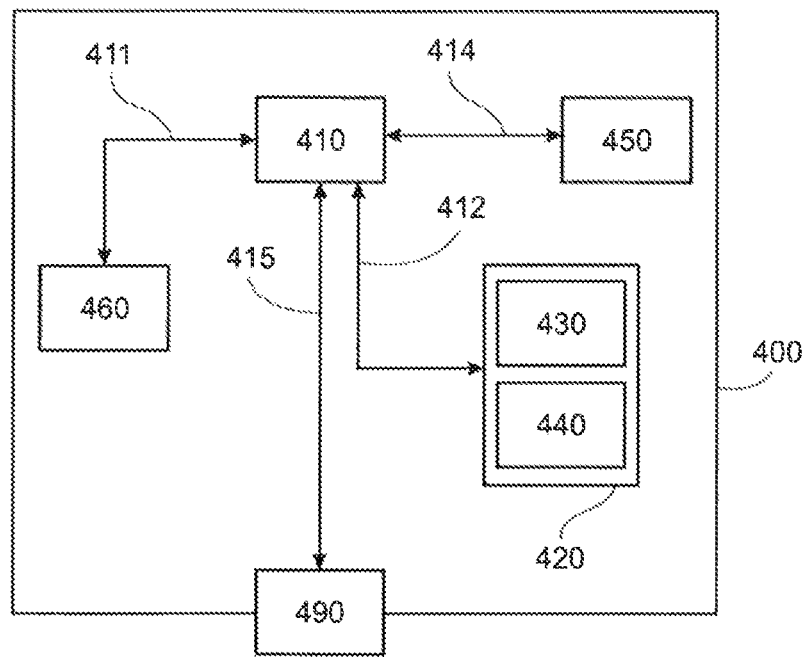
FIG. 5 shows a control device according to an embodiment of the invention.

FIG. 5 shows a control device 400 configured for carrying out the method according to embodiments of the invention, comprising a non-volatile memory 420, a data-processing unit 410 and a read and write memory 460. The memory 420 has a first memory part 430, in which a computer program for controlling the control device 400 is stored. The computer program in the memory part 430 for controlling the control device 400 can be an operating system.

The control device 400 can be comprised in the control device 10 described above with reference to FIG. 1. The data-processing unit 410 can comprise, for example, a microcomputer. The memory 420 also has a second memory part 440, in which a program for controlling the powertrain according to the invention is stored. In an alternative embodiment, the program for controlling the powertrain is stored in a separate non-volatile storage medium 450 for data, such as, for example, a CD or an exchangeable semiconductor memory. The program can be stored in an executable form or in a compressed state. When it is stated below that the data-processing unit 410 runs a specific function, it should be clear that the data-processing unit 410 is running a specific part of the program stored in the memory 420 or a specific part of the program stored in the non-volatile storage medium 450. The data-processing unit 410 is tailored for communication with the non-volatile storage medium 450 through a data bus 414. The data-processing unit 410 is also tailored for communication with the memory 420 through a data bus 412. In addition, the data-processing unit 410 is tailored for communication with the memory 460 through a data bus 411. The data-processing unit 410 is also tailored for communication with a data port 490 by the use of a data bus 415.

It is to be understood that the present invention is not limited to the embodiments described above and illustrated in the drawings; rather, the skilled person will recognize that many changes and modifications may be made within the scope of the appended claims.

The invention claimed is:

1. A method for controlling a powertrain of a vehicle, the powertrain comprising:
   an engine comprising mutually independently operable valves, the engine being configured to be operated in a four-stroke operation mode, and
   a drivetrain comprising a transmission,
the method comprising:
   while operating the engine in the four-stroke operation mode, identifying that a critical situation applies or is expected to apply, in which a fast downshift of the transmission is required,
   initiating a downshift process in response to the identification of the critical situation, during at least a part of the downshift process, increasing an engine speed by controlling at least the mutually independently operable valves of the engine such that the engine is temporarily operated in a two-stroke operation mode.

2. The method according to claim 1, wherein the step of identifying that the critical situation applies or is expected to apply comprises assessing information relating to a road slope of a road on which the vehicle travels or is expected to travel.

3. The method according to claim 2, wherein the step of identifying that the critical situation applies or is expected to apply further comprises assessing information relating to a weight of the vehicle.

4. The method according to claim 1, wherein the downshift process comprises engaging a selected gear once a target engine speed for downshifting has been reached.

5. The method according to claim 4, wherein the downshift process comprises increasing the engine speed in the two-stroke operation mode to at least the target engine speed.

6. The method according to claim 5, wherein the downshift process further comprises braking the engine in the two-stroke operation mode once the target engine speed has been reached.

7. The method according to claim 1, further comprising:
   subsequently to the downshift process, controlling the mutually independently operable valves of the engine such that the four-stroke operation mode of the engine is resumed.

8. The method according to claim 7, further comprising:
   subsequently to the downshift process and prior to resuming the four-stroke operation mode, continuing to operate the engine in the two-stroke operation mode until a predefinable condition is fulfilled.

9. The method according to claim 1, wherein the critical situation is expected to arise during downhill travel, and wherein a vehicle speed of the vehicle is expected to increase in the critical situation.

10. The method according to claim 1, wherein the downshift process comprises disengaging the drivetrain from the engine prior to the step of controlling the valves of the engine such that the engine is temporarily operated in the two-stroke operation mode.

11. The method according to claim 1, wherein, when the identified critical situation is an uphill critical situation, the step of controlling the valves of the engine such that the engine is operated in the two-stroke operation mode is initiated prior to disengaging the drivetrain from the engine.

12. A control device for controlling a powertrain of a vehicle, the powertrain comprising:
   an engine comprising mutually independently operable valves, the engine being configured to be operated in a four-stroke operation mode, and
   a drivetrain comprising a transmission,
   the control device comprising means adapted to execute the steps of the method according to claim 1.

13. A computer program comprising program code means for causing the control device of claim 12 to execute the steps comprising:
   while operating the engine in the four-stroke operation mode, identifying that a critical situation applies or is expected to apply, in which a fast downshift of the transmission is required,
   initiating a downshift process in response to the identification of the critical situation,
   during at least a part of the downshift process, increasing an engine speed by controlling at least the mutually independently operable valves of the engine such that the engine is temporarily operated in a two-stroke operation mode.

14. A computer readable medium having stored thereon a computer program according to claim 13.

15. A vehicle comprising a powertrain, the powertrain comprising:
   an engine comprising mutually independently operable valves, the engine being configured to be operated in a four-stroke operation mode, and
   a drivetrain comprising a transmission,
wherein the vehicle further comprises a control device according to claim 12.

* * * * *